Feb. 21, 1939.   N. R. GREATHOUSE   2,147,648
SYNCHRONIZED THEATER PRODUCTION
Filed May 20, 1935   2 Sheets-Sheet 1
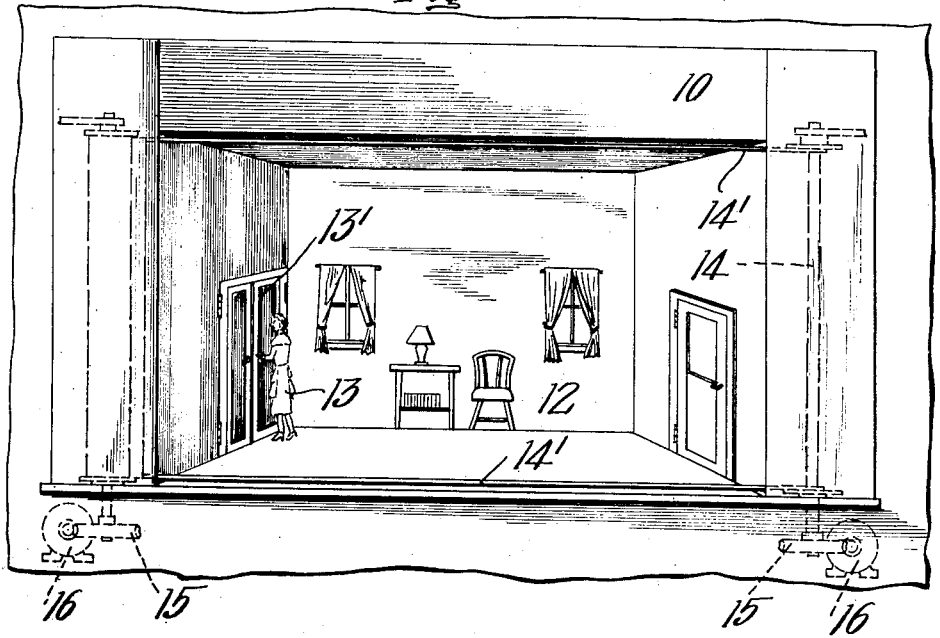
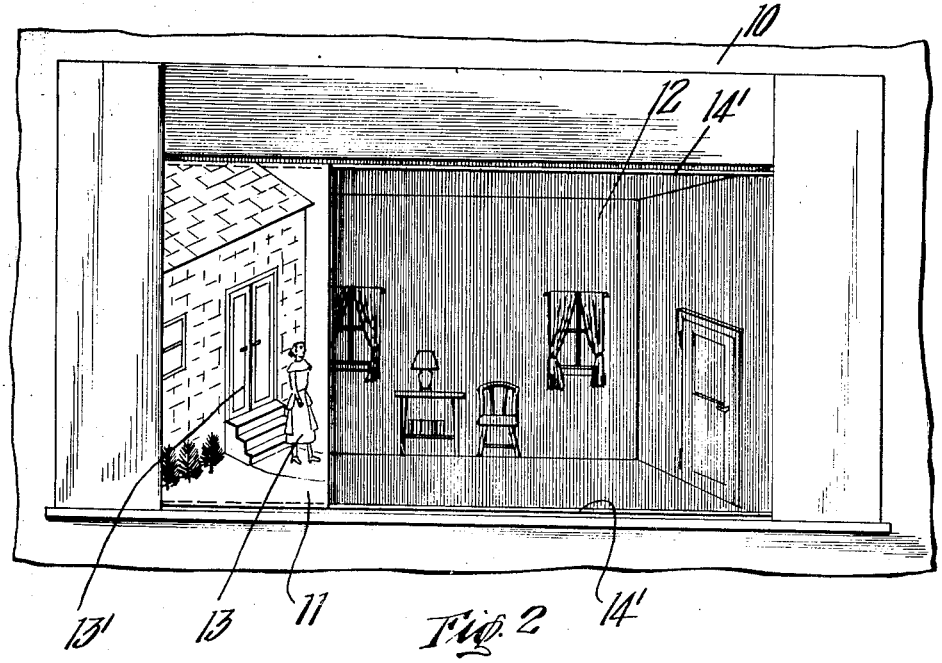
INVENTOR
Norman R. Greathouse
BY
ATTORNEY

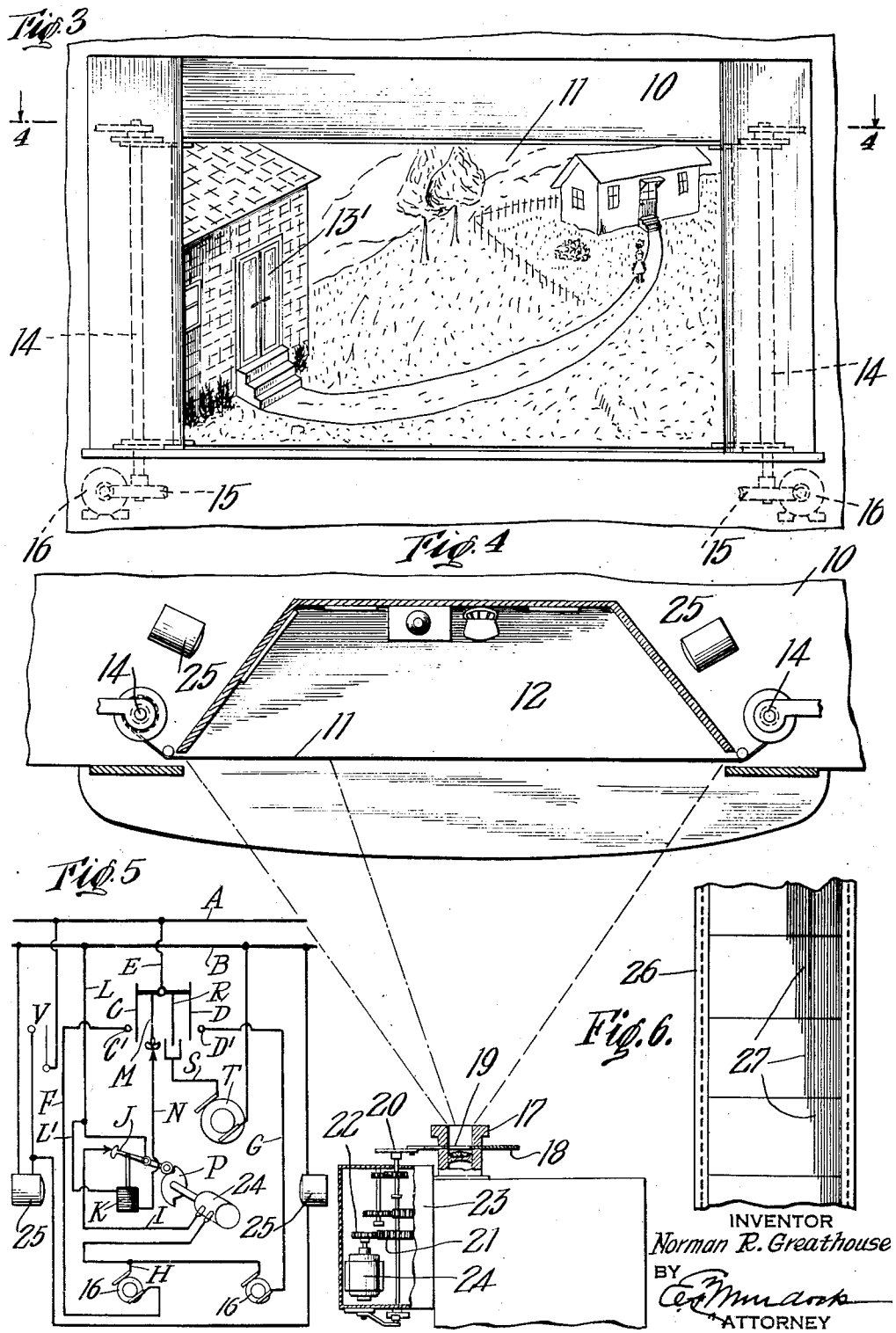

Patented Feb. 21, 1939

2,147,648

UNITED STATES PATENT OFFICE 2,147,648

SYNCHRONIZED THEATER PRODUCTION

Norman R. Greathouse, New York, N. Y.

Application May 20, 1935, Serial No. 22,428

18 Claims. (Cl. 272—10)

Among the principal objects which the present invention has in view are: To present a synchronization of stage characters and characters appearing on a moving picture screen; to obtain a smooth sequence and coordination between parts of a theatrical presentation, portions of which may be presented by actors upon the stage, and portions by a moving picture, where the presentation may proceed without interruption as one type of presentation gives way to the other; to present an illusion of a screen picture to the audience, thereby conveying presence in a particular place; to eliminate usual stage scenery setting, thereby permitting a particular scene to be played with employment of simple stage props, such as desk, bed, and so forth, with the assistance of well-known stage lighting effects; to enable, through photography, to present characters to be life-size in the foreground of a picture, and similar in size to the characters appearing on the stage, as the screen or picture is making a fade-out; to provide means simultaneously to cut off the showing of a picture as the screen is being moved in any direction; to be enabled to control the operating means from any advantageous point, such as from the stage or picture booth; to secure other advantages or results; and to obtain simplicity of construction and operation as may be brought out in the following description.

On the drawings, in which the invention is exemplified, without intention of limitation to specific means disclosed, Figures 1, 2, and 3 are front elevations of a screen and stage setting embodying features of my invention;

Figure 4 is a diagrammatic plan view of a stage, a screen setting, and a projection camera, parts being broken away in section to disclose a possible construction of means for producing the cut-off of a picture, and of a stage presentation, the stage being shown as it would appear if sectioned on the line 4—4 of Figure 3;

Figure 5 is a wiring diagram, showing a method of operating the several features of the invention, and Figure 6 is an elevational view of a portion of a film, showing the same shaded to indicate the portion effecting a fade-out of the picture being shown on the screen, as the screen is moving from view on the stage.

As seen on the drawings, and referring more particularly to Figures 1 to 4, inclusive, it will be noted that the showing made is of a stage 10 such as used in theaters for the production of plays and picture projection on screens. In the present showing, I have attempted to depict, by the several figures, the presentation of an illusion to an audience, whereby synchronization of the picture being shown on screen 11 will be made possible with the actual characters appearing on setting 12 of the stage. That is to say, as a character 13, as shown in Figure 1, is about to make an exit through door 13', screen 11 (in Figure 2) gradually appears from the left of the stage, or from the right side of the stage, should the character make an exit from that side. As the screen appears in front of the stage setting, the usual stage lighting effects are dimmed simultaneously with the throwing on of the picture on the screen, or as the pick-up of character 13 takes place as having actually made the exit through the door to the exterior, as clearly shown in Figure 3. Therefore, as shown in Figures 1, 2 and 3, there will be an illusion, to the audience, of the character as on the stage in person, and the pick-up made by the screen, gradually fading out the stage setting, and showing, by photography, the same character as having left the interior, and shown in the exterior, after the screen has been fully extended across the front of the stage. Also, it is preferred, in carrying out the synchronization of stage and screen, that the characters appearing in the foreground of the picture be of life-size, such as shown in Figures 1 and 2. The accomplishment of this showing will greatly add to the illusion, particularly when the continuity of a play is desired without interruption, especially for interior and exterior settings.

In carrying out the invention, I have shown a preferred form of screen 11 as operable crosswise of stage 10. In operating the screen crosswise of the stage 10, it will be noted that both ends may be preferably attached to rotatable uprights 14, 14, one at each end of the stage, by virtue of cables 14' or the like, which are fastened to the uprights at the bottom and top thereof, and it is to these cables or the like to which the ends of screen 11 are attached. In operation, uprights 14, 14, may be rotated by utilization of any suitable means, one such means being shown as gears 15, and motors 16 driving the same. Said gears and motors preferably are under the stage flooring, and said motors are operable independently of each other, depending on the direction the screen is travelling across the stage. Means for setting motors 16 into motion will be hereinafter more fully described when describing the showing made in Figure 5 of the drawings, wherein I have illustrated a wiring diagram for making the method of operation more clear.

As the screen moves into place across the stage, picture projector 17, with film therein, simultaneously is put into operation to pick-up the continuity of the stage showing. That is to say, projector 17 may be provided with a slidable shutter 18 having an opening 19 equal in diameter to the opening of projector 17, as shown in Figure 4. Mechanical or electrical means may be employed to operate the shutter, to synchronize the characters leaving the stage setting to appear on screen 11 (or vice versa), as the screen gradually works across the stage, thereby carrying on the continuity of an interior setting to an exterior setting. One such means may be an eccentric 20, attached to one end of slidable shutter 18, which, in operation, will tend to fade out a picture or continue the showing of the stage setting on the screen as the said screen moves across the front of the stage.

To operate the eccentric, I have shown a train of gears 21, 22, within a housing 23, said housing and gears preferably being a part of the projection camera construction. A motor 24 is utilized for operating gear 22, which gear, in turn, operates gear 21 mounted on a shaft supporting eccentric 20. As screen 11 continues travelling across the stage, shutter 18, with opening 19, likewise moves by virtue of eccentric 20. The picture being projected is only on the portion of the screen appearing in front of the stage, and as the screen extends further across the stage, more of the picture appears thereon, opening 19 in the shutter progressively advancing across the projector opening until the screen is entirely across the stage, after which the picture likewise is then shown in its entirety.

When the characters are ready to appear on the stage setting, which has been changed from the showing made previous to running the continuity on the screen, shutter 18 then preferably acts in the capacity of a fade-out for the picture, as the characters are then making an entrance to an interior from the exterior (or vice versa). However, it is to be understood that the characters, as they leave the screen picture, need not be shown on the stage until the screen has been fully removed, at which time the stage lights 25 may be thrown on.

Referring now more particularly to Figure 5, I have shown a wiring diagram whereby the above operation may be obtained. While this illustration shows a specific diagram, I do not necessarily wish to be confined thereto nor to the details of the method of operation, as other methods and hook-ups may be utilized in carrying out the invention if so desired. In Figure 5, the source of electric current supply is shown by mains A and B. Selective circuit-closing means is provided, such as the four-bladed, double-throw switch, all of the blades of which may be connected with one main through lead E so that, when the switch is thrown in one direction, say, toward the left, blade C contacts with the point C', whereas opposite movement contacts blade D with point D'. From one switch point, as C', is a lead F to one motor 16 for the screen, whereas from the other blade point D' is a lead G to the other motor. Switch C—D accordingly enables either motor to be operated. The electrical return circuit from both of these motors is the same, and, preferably, by wire H, connects with shutter motor 24 for obtaining simultaneous operation of shutter 18 and screen 11. The return wire also passes, by wire I, to a switch J operated by a solenoid K, returning to main B by wire L.

Main switch C—D may also conveniently include or operate another blade or contact M, to close a circuit N to the solenoid which makes a complete return circuit through wires L' and L to main B. This blade or contact is preferably such that the solenoid is caused to function to close the solenoid switch just as the main blades C, D close to operate the screen 11 and shutter 18. The solenoid switch arm is thus raised, and a cam P, operated by shutter motor 24, holds the switch closed until the shutter is moved through its entire path, whereupon the solenoid switch opens and stops further movement of screen 11 or shutter 18 until main switch C—D is swung in the opposite direction.

Main switch C—D may likewise control, through another blade R the current to a motor T by which the projector operates the film. Blade R closes circuit S to motor T no matter which way switch C—D is swung, and keeps this circuit closed independent of the opening of the circuit through the solenoid switch. Consequently, the projector will continue to function after the screen and shutter have ceased to move.

Flood lights 25, 25, for use backstage or elsewhere, may be connected in any desired manner to mains A and B, with an appropriate switch V to open and close the circuit. According to the present invention, main switch C—D may be placed at an advantageous point, for instance, back stage or in the projection booth, as found most convenient. Also, the present invention is adaptable to use for talking pictures, that is, the film used in carrying on the continuity may be provided with a sound track as used at present.

If it is desired, for any reason, not to use shutter 18 for fading out the picture simultaneously with the moving of the screen from the stage, I have shown, in Figure 6, a portion of picture film 26. Therefore, instead of using the shutter mechanism, the film being projected onto the screen may be provided with darkened parts 27 so spaced that the fade-out will synchronize with the timed movement of the screen.

While I have shown and described my invention as embodying certain features, I do not wish to be understood as limiting myself to the specific construction shown or described, except when construed in the light of the prior art and the claims.

I claim:

1. A stage effect comprising in combination a stage setting and a screen movable from either side of the stage across said setting, means for projecting a picture upon such part of the screen as appears at any moment in front of the setting, means for eliminating reproduction of the picture on the setting not hidden by the screen, and means for synchronizing the screen movement and picture eliminating means, said means comprising an eccentric which is part of the eliminating means, a series of gears and a motor for operating said gears, and means for connecting the screen to said motor whereby synchronization of the eccentric for operation of the elimination means and movement of the screen will take place.

2. A stage effect comprising in combination a stage setting and a movable screen, means for projecting a picture upon such part of the screen as appears at any moment in front of the setting, means for eliminating reproduction of the picture on the setting still in view, and means for synchronizing the screen movement and picture eliminating means, said means comprising an eccentric which is part of the eliminating means, a series of gears and a motor for operating said gears, and means for connecting the screen to said motor whereby synchronization of the eccentric for operation of the elimination means and movement of the screen will take place.

3. The art of producing a theatrical presentation which comprises carrying on action by one or more human actors in the field of vision of an audience, and then simultaneously introducing the action of a moving picture progressively into the same field of vision and eliminating the sight of the action of the human actors progressively from that field of vision.

4. The art of producing a theatrical presentation which comprises carrying on action by one or more human actors in the field of vision of an audience, then simultaneously introducing the action of a moving picture progressively into the same field of vision and eliminating the sight of the action of the human actors progressively from that field of vision, and then simultaneously eliminating the action of the moving picture progressively from the field of vision and bringing progressively into that same field of vision the action of the human actors.

5. The art of producing a theatrical presentation which comprises carrying on the action of a moving picture in the field of vision of an audience, and then simultaneously eliminating the action of the moving picture progressively from the field of vision and bringing progressively into that same field of vision the action of one or more human actors.

6. The art of producing a single, continuous theatrical presentation which comprises depicting one or more of the sequences of the presentation by the action of one or more human actors in the field of vision of an audience, and then simultaneously introducing the action of a moving picture progressively into the same field of vision and eliminating the sight of the action of the human actors progressively from that field of vision.

7. The art of producing a single, continuous theatrical presentation which comprises depicting one or more of the sequences of the presentation by the action of one or more human actors in the field of vision of an audience, and then, without interruption and within the same field of vision, depicting one or more other sequences of the presentation by the action of a moving picture by simultaneously introducing the action of the moving picture progressively into that same field of vision and eliminating the sight of the action of the human actors progressively from that field of vision.

8. The art of producing a single, continuous theatrical presentation which comprises depicting one or more of the sequences of the presentation by the action of one or more human actors in the field of vision of an audience, then, without interruption and within the same field of vision, depicting one or more other sequences of the presentation by the action of a moving picture by simultaneously introducing the action of the moving picture progressively into that same field of vision and eliminating the sight of the action of the human actors progressively from that field of vision, and then, without interruption and still within the same field of vision, depicting one or more further sequences of the presentation by the action of human actors by simultaneously eliminating the action of the moving picture progressively from the field of vision and bringing progressively into that same field of vision the action of the human actors.

9. The art of producing a single, continuous theatrical presentation which comprises depicting one or more of the sequences of the presentation by the action of a moving picture in the field of vision of an audience, and then, without interruption and still within the same field of vision, depicting one or more further sequences of the presentation by the action of human actors by simultaneously eliminating the action of the moving picture progressively from the field of vision and bringing progressively into that same field of vision the action of one or more human actors.

10. The art of producing a theatrical presentation which comprises carrying on action by one or more human actors on a stage in the field of vision of an audience, then simultaneously eliminating the action of the human actors progressively from the field of vision by progressively moving a screen between the audience and the actors upon the stage, and, simultaneously with the movement of the screen, depicting upon the screen the action of a moving picture having the same extent as the screen already moved between audience and actors and of an extent increasing as the screen increases in extent.

11. The art of producing a theatrical presentation which comprises simultaneously introducing the action of a moving picture progressively into the field of vision of an audience by progressively moving a screen into that field of vision and simultaneously projecting upon that screen a moving picture having substantially the same extent at any particular instant as that of the screen already in the sight of the audience and progressively accommodating itself to the extent of the screen.

12. The art of producing a theatrical presentation which comprises simultaneously varying the action of a moving picture within the field of vision of an audience by progressively moving a screen within that field of vision to vary the area of the screen exposed to the view of the audience within that field of vision, and simultaneously projecting upon that screen of varying area a moving picture having substantially the same extent at any particular instant as the area of the screen then in the sight of the audience and progressively accommodating itself to the extent of the screen.

13. The art of producing a theatrical presentation which comprises simultaneously varying the action of a moving picture within the field of vision of an audience by progressively moving a screen within that field of vision to vary the area of the screen exposed to the view of the audience within that field of vision, and simultaneously projecting a moving picture upon that screen of varying area and controlling the coverage of the projected moving picture so that it has substantially the same extent at any particular instant as the area of the screen then in the sight of the audience and progressively accommodates itself to the extent of the screen.

14. The art of producing a theatrical presentation which comprises simultaneously varying the action of a moving picture within the field of vision of an audience by progressively moving a screen within that field of vision to vary the area of the screen exposed to the view of the audience within that field of vision, and simultaneously projecting a moving picture upon that screen of varying area and masking the projected moving picture so that it has substantially the same extent at any particular instant as the area of the screen then in the sight of the audience and progressively accommodates itself to the extent of the screen.

15. The art of producing a theatrical presentation which comprises simultaneously varying the action of a moving picture within the field of vision of an audience by progressively moving a screen within that field of vision to vary the area of the screen exposed to the view of the audience within that field of vision, and simultaneously projecting a moving picture upon that screen of varying area and masking the projected moving picture so that it has substantially the same extent at a particular instant as the area of the screen then in the sight of the audience, and varying the masking of the moving picture synchronously with the variation of the exposed screen area to accommodate the coverage of the projected picture to the extent of the screen.

16. Apparatus for producing a compound theatrical presentation which comprises: a screen, means for moving the screen across the field of vision of an audience, means for projecting a moving picture upon the screen, means for controlling the coverage area of the picture projected by the film, and means for synchronizing the screen-moving means and the coverage-controlling means so that the projected picture at any instant shall correspond with the extent of the screen within the field of vision.

17. Apparatus for producing a compound theatrical presentation which comprises: a screen, means for moving the screen across the field of vision of an audience, means for projecting upon the screen a moving picture of variable coverage area, and means for synchronizing the screen-moving means and the picture-projecting means so that the projected picture at any instant shall correspond with the extent of the screen within the field of vision.

18. Apparatus for producing a compound theatrical presentation which comprises: a screen for positioning within the field of vision of an audience, means for varying the area of the screen exposed to view within that field of vision, means for projecting upon the screen a moving picture of variable coverage area, and means for synchronizing the screen-area-varying means and the picture-projecting means so that the projected picture at any instant shall correspond with the exposed area of the screen within the field of vision.

NORMAN R. GREATHOUSE.